US012680245B2

(12) United States Patent　　　(10) Patent No.:　US 12,680,245 B2

Ismail　　　(45) Date of Patent:　　　Jul. 14, 2026

(54) VERTIPORT HAVING DAMPING MATERIAL COVERING PORTION OF BASE SURFACE OF LAUNCHING PLATFORM

(71) Applicant: SUPERNAL, LLC, Washington, DC (US)

(72) Inventor: Yahia Ismail, Redmond, WA (US)

(73) Assignee: Supernal, LLC, Washington, DC (US)

( * ) Notice: Subject to any disclaimer, the term of this patent is extended or adjusted under 35 U.S.C. 154(b) by 245 days.

(21) Appl. No.: 18/377,302

(22) Filed: Oct. 5, 2023

(65) Prior Publication Data

US 2025/0333916 A1　　　Oct. 30, 2025

Related U.S. Application Data

(60) Provisional application No. 63/413,954, filed on Oct. 6, 2022.

(51) Int. Cl.
E01F 3/00　　　(2006.01)
B64F 1/26　　　(2006.01)

(52) U.S. Cl.
CPC . E01F 3/00 (2013.01); B64F 1/26 (2013.01)

(58) Field of Classification Search
CPC ...... B64F 1/22; B64F 1/26; B64F 1/36; B64F 1/007; B64F 1/31; B64F 1/222; B64F 1/18; B64U 70/90; E01F 3/00; E04H 6/44
See application file for complete search history.

(56) References Cited

U.S. PATENT DOCUMENTS

| | | | | |
|---|---|---|---|---|
| 2,973,295 A | * | 2/1961 | Rodgers, Jr. ......... | B65D 65/403 |
| | | | | 181/290 |
| 4,143,495 A | * | 3/1979 | Hintz ...................... | E01F 8/007 |
| | | | | 181/290 |
| 5,622,662 A | * | 4/1997 | Veiga ...................... | F16F 9/306 |
| | | | | 156/247 |
| 7,484,589 B2 | * | 2/2009 | Guo .......................... | B64F 1/26 |
| | | | | 181/290 |
| 8,662,000 B2 | * | 3/2014 | Vandenworm .......... | B63B 21/50 |
| | | | | 114/263 |
| 9,394,685 B2 | * | 7/2016 | Dollhopf ................... | E04B 1/84 |
| 11,225,762 B2 | * | 1/2022 | Osborne ................. | B64F 1/205 |
| 11,535,989 B2 | * | 12/2022 | Sarpotdar .............. | G05B 15/02 |
| 2004/0118633 A1 | * | 6/2004 | Evans ....................... | E04B 1/86 |
| | | | | 181/290 |
| 2005/0194205 A1 | * | 9/2005 | Guo ......................... | G10K 11/16 |
| | | | | 181/290 |
| 2016/0047119 A1 | * | 2/2016 | Dollhopf .............. | G10K 11/168 |
| | | | | 181/290 |
| 2021/0032820 A1 | * | 2/2021 | Sarpotdar ................. | B64F 1/26 |
| 2023/0124771 A1 | * | 4/2023 | Bastiyali ................ | B63B 35/50 |
| | | | | 244/114 R |

FOREIGN PATENT DOCUMENTS

| | | | | | |
|---|---|---|---|---|---|
| CN | 106023974 B | * | 10/2019 | ............. | G10K 11/16 |
| KR | 20130075829 A | * | 7/2013 | ................ | E01F 3/00 |

* cited by examiner

*Primary Examiner* — Arfan Y. Sinaki

(74) *Attorney, Agent, or Firm* — McDonnell Boehnen Hulbert & Berghoff LLP

(57)　　　ABSTRACT

A vertiport is disclosed. The vertiport includes a launching platform having a base surface and a damping material such that the damping material covers at least a portion of the base surface.

21 Claims, 7 Drawing Sheets

VERTIPORT HAVING DAMPING MATERIAL COVERING PORTION OF BASE SURFACE OF LAUNCHING PLATFORM

CROSS-REFERENCE TO RELATED APPLICATION

The present application claims priority to provisional U.S. Application No. 63/413,954 filed Oct. 6, 2022, the contents of which are hereby incorporated by reference in its entirety.

BACKGROUND

A vertiport is a structure that can support the landing and takeoff of an aircraft, such as a vertical takeoff and landing ("VTOL") aircraft, a helicopter, a drone, or the like. Vertiports may be installed in a variety of locations and environments to facilitate transportation of passengers, including for example, in an urban environment that includes a variety of buildings, businesses, and homes.

As a person of ordinary skill in the art will realize, some aircraft, particularly passenger-sized aircraft, can generate noise while in use, including during takeoff and landing maneuvers. This noise may be uncomfortable or unpleasant to passengers of the aircraft as well as to other people in proximity to the vertiport.

Accordingly, the present invention seeks to utilize the vertiport structure (and accompanying structures, where applicable) to minimize the noise from aircraft utilizing the vertiport.

SUMMARY

Embodiments described herein relate to a vertiport for an aircraft, such as an electric VTOL aircraft, and, more particularly, to structures and methods for attenuating noise and enhancing stability during an aircraft landing and takeoff.

An example embodiment includes a vertiport for an aircraft, the vertiport comprising a launching platform having a base surface and a damping material such that the damping material covers at least a portion of the base surface.

These as well as other aspects, advantages, and alternatives will become apparent to those of ordinary skill in the art by reading the following detailed description, with reference, where appropriate, to the accompanying drawings.

DETAILED DESCRIPTION

Disclosed herein are examples of a vertiport having a damping material for attenuating noise, enhancing stability, and reducing vibrations during an aircraft landing and/or takeoff. The dampening material can be used to absorb aircraft noise.

Figure 1:
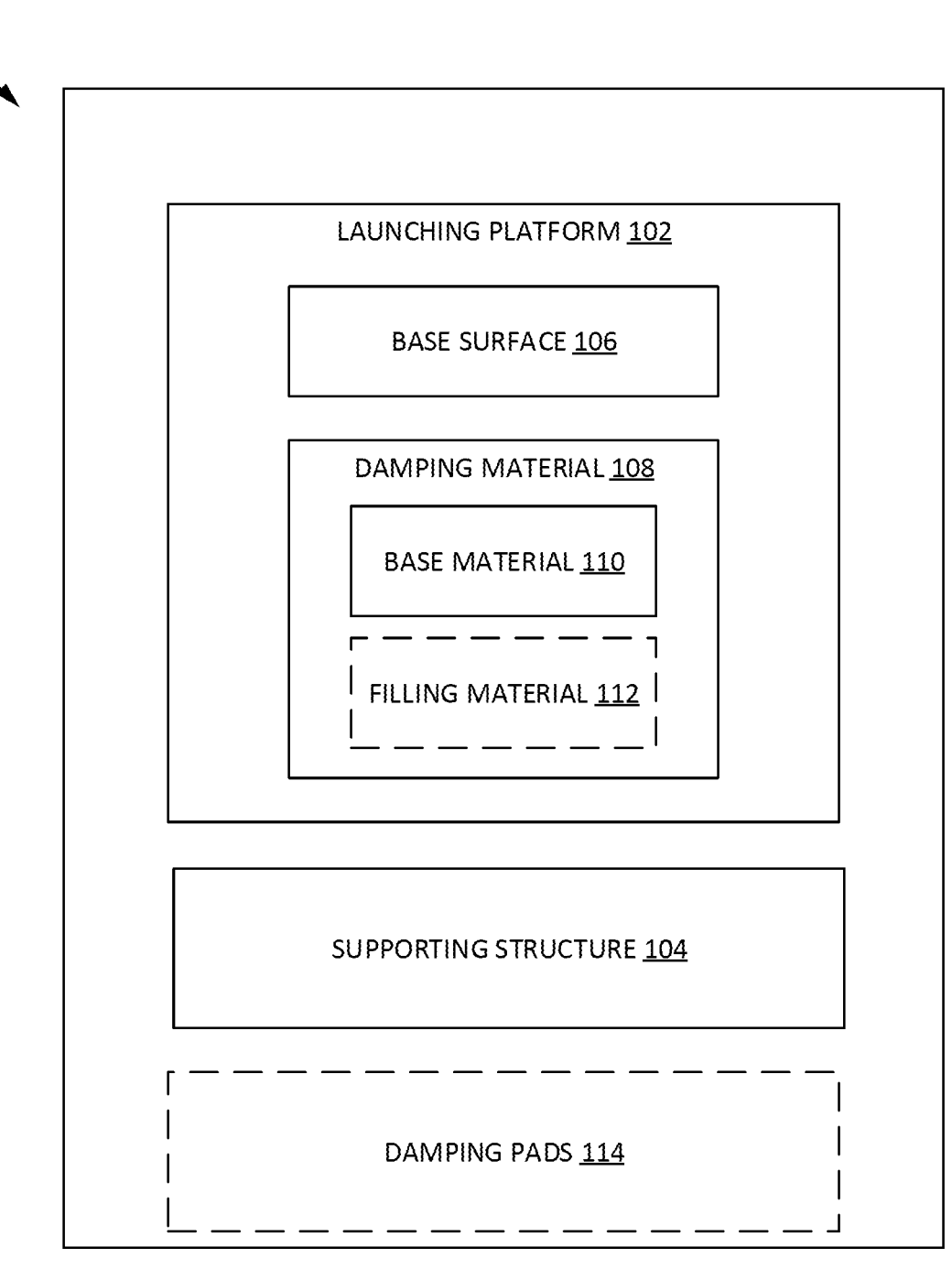
FIG. 1 is a block diagram of a vertiport, according to exemplary embodiments of the present invention.

FIG. 1 is a block diagram of a vertiport, according to exemplary embodiments of the present invention. As illustrated, the embodiment may include a vertiport 100, having a launching platform 102 and a supporting structure 104. As a person of ordinary skill in the art will recognize, the launching platform 102 may be a takeoff and landing area for an aircraft (e.g., a VTOL aircraft), which may be used for pick-up and drop-off of passengers and/or goods. In some embodiments, the launching platform 102 may be configured to accommodate the takeoff and landing of a single aircraft. In other instances, the vertiport 100 may be configured to accommodate the takeoff and landing of multiple aircraft simultaneously or may include a plurality of launching platforms 102 as part of the same vertiport 100. As a person of ordinary skill in the art will appreciate, the launching platform 102 may also include facilities commonly associated with airports, such as maintenance and refueling/charging facilities, passenger ticketing and waiting facilities, restaurants, shopping, and the like.

In some embodiments, the vertiport 100 may be any suitable shape (e.g., circular, square, rectangular, etc.) and may include a touchdown and lift off area (TLOF), final approach and takeoff area (FATO), and a safety area for aircraft operation. The TLOF is a part of the launching platform 102 that is load-bearing, clear of penetrations and obstructions, and designed to support the weight and shape of aircraft. The TLOF may be located, for example, at ground level (on terrain or on a level platform), on an elevated structure, or at a rooftop level. The TLOF may also be integrated into an airport intended to support takeoff and landing of non-VTOL aircraft (such as airplanes and helicopters).

The FATO is also part of the launching platform 102 and may surround the TLOF and the FATO is also designed to be load-bearing, clear of penetrations and obstructions, and support the weight and shape of aircraft. The safety area of the vertiport 100 may surround the launching platform 102.

In some embodiments, a controlling dimension of the aircraft, or the diameter of the smallest circle enclosing the aircraft projection on a horizontal plane while the aircraft is in take-off or landing position, that is able to use the vertiport 100 may define the minimum size of the TLOF and the FATO of the vertiport 100. For instance, in some embodiments, a width and length and/or a diameter of the TLOF may be equal to or greater than one controlling dimension of the aircraft able to use the vertiport 100, a width and length and/or a diameter of the FATO may be equal to or greater than two controlling dimensions of the aircraft (or one controlling dimension on any exterior perimeter of the TLOF), and a width and length and/or a diameter of the safety area may be equal to or greater than three controlling dimensions of the aircraft (or one half of a controlling dimension on any exterior perimeter of the FATO). Further, in some embodiments, an elevation of the TLOF and an elevation of the FATO may be equal. In other embodiments, only an innermost edge of the FATO may be at the same elevation as the TLOF and a perimeter of the FATO may be at an elevation that is less than the elevation of the innermost edge of the FATO. In some embodiments, the safety area may have the same or less elevation as the TLOF and the FATO.

In some embodiments, a perimeter of the FATO (or a perimeter of the launching platform 102) may further include a safety net that is at least five feet wide and has inside and outside edges fastened to a solid structure, may be constructed of materials that are resistant to environmental factors, may have a load carrying capability of 50 pounds per square foot, and may be located at or below the edge elevation of the perimeter of the FATO.

The launching platform 102 may include a base surface 106 and/or a damping material 108 such that the damping material 108 covers at least a portion of the base surface 106.

The base surface 106 of the launching platform 102 could be a variety of shapes, sizes, and materials, as a person of ordinary skill in the art will understand. For instance, the base surface 106 may have a cylindrical shape, rectangular shape, cubical shape, conical-frustum shape, trapezoidal shape, or a combination of multiple shapes. The base surface 106 could be constructed from clay, concrete, cement, stone, pavement, metal, or a combination of materials. In some embodiments, the base surface 106 is the size of a FATO of the vertiport 100.

The damping material 108 may include a base material 110, which may be a plastic, a polymer, a rubber or other suitable substances known to those skilled in the art. For instance, the base material 110 may be a rubber, such as a natural rubber, a synthetic rubber, a silicone rubber; a loose-fill material, such as pea gravel, loose rubber fill, engineered wood fiber, aggregate-turf; or a thermoplastic, such as a thermoplastic olefin and a thermoplastic elastomer. In some embodiments, the base material 110 is an acoustically absorbing material.

The damping material 108 may have a certain stiffness to damping ratio such that the base material 110 is stiff enough to reduce deformation or wear with use (e.g., takeoff and landing cycles), support passenger ingress and egress from an aircraft, and absorb noise, vibration, and force of the aircraft. Acoustic properties, such as porosity and impedance; particle size; and shape of the base material 110, may be considered in determining the stiffness to damping ratio.

In some examples, the damping material 108 may include a filling material 112. In such embodiments, the filling material 112 may be inserted into the base material 110 by a method known to those skilled in the art, such as an injection method intended to ensure the base material 110 of the damping material 108 substantially surrounds or encloses the filling material 112. For instance, when the base material 110 is rubber, the filling material 112 may be a bulk absorber or particles that is injected into the rubber. In some embodiments, the filling material 112 is an aerogel or another synthetic porous material derived from a gel, in which the liquid component for the gel has been replaced with a gas. In some embodiments, the liquid component for the gel may be replaced with a gas such that it prevents the collapse of the gel structure. In some embodiments, the filling material 112 is an acoustically absorbing material.

In some embodiments, the damping material 108 may include a base material 110 having a series of channels across a length of the damping material 108. By filling the series of channels in the base material 110 with the filling material 112, the damping material 108 can have an acoustically varying impedance across the length of the damping material 108.

In some embodiments, the damping material 108 covers the entirety of the launching platform 102. In other embodiments, the damping material 108 may cover a portion of the launching platform 102, such as a top portion of the launching platform 102.

As a person of ordinary skill in the art will realize, the damping material 108 could be used to attenuate noise during an aircraft takeoff and landing, enhance stability during an aircraft takeoff and landing, and/or reduce vibrations during an aircraft takeoff and landing. The damping material 108 could be used to absorb noise from the aircraft that extends into the surrounding area. In addition, the damping material 108 could be used to attenuate noise travelling to any passengers traveling within the aircraft or to any people standing by the vertiport 100 during takeoff and landing of the aircraft. The damping material 108 could also be used to reduce impact and absorb force on an aircraft during takeoff and landing. For instance, in some embodiments, the damping material 108 can reduce the requirements for landing gear on the aircraft. Also, in emergency situations, the damping material 108 can absorb some of the impact of an aircraft, such as when landing when the landing gear of the aircraft is not fully operable. The damping material 108 may prevent catastrophic failure of the aircraft in emergency landing situations by reducing the forces received by other components in the area.

The supporting structure 104 may include any launching area to house the launching platform 102 and the safety area for an aircraft during takeoff and landing. The supporting structure 104 may be a surface structure, an enclosure, or a building.

In some embodiments, one or more damping pads 114 may be incorporated into the vertiport 100 itself or on other objects or buildings in the environment around the vertiport 100. For instance, if the vertiport is located between one or more tall buildings, the damping pads 114 may be applied to walls of those tall buildings around the vertiport 100, a rooftop, a ground, or other objects in the area of vertiport 100, such as chimneys and ledges. The damping pads may also be applied to objects located in or around the vertiport, such as for example, garbage cans, HVAC systems, antennae, vehicles, and other objects that will be known to those skilled in the art. The damping pads 114 may aid in noise and vibration absorption in the surrounding area of vertiport 100 and may be formed using any of the structures and materials described above with respect to the damping material 108.

Figures 2A, 2B:
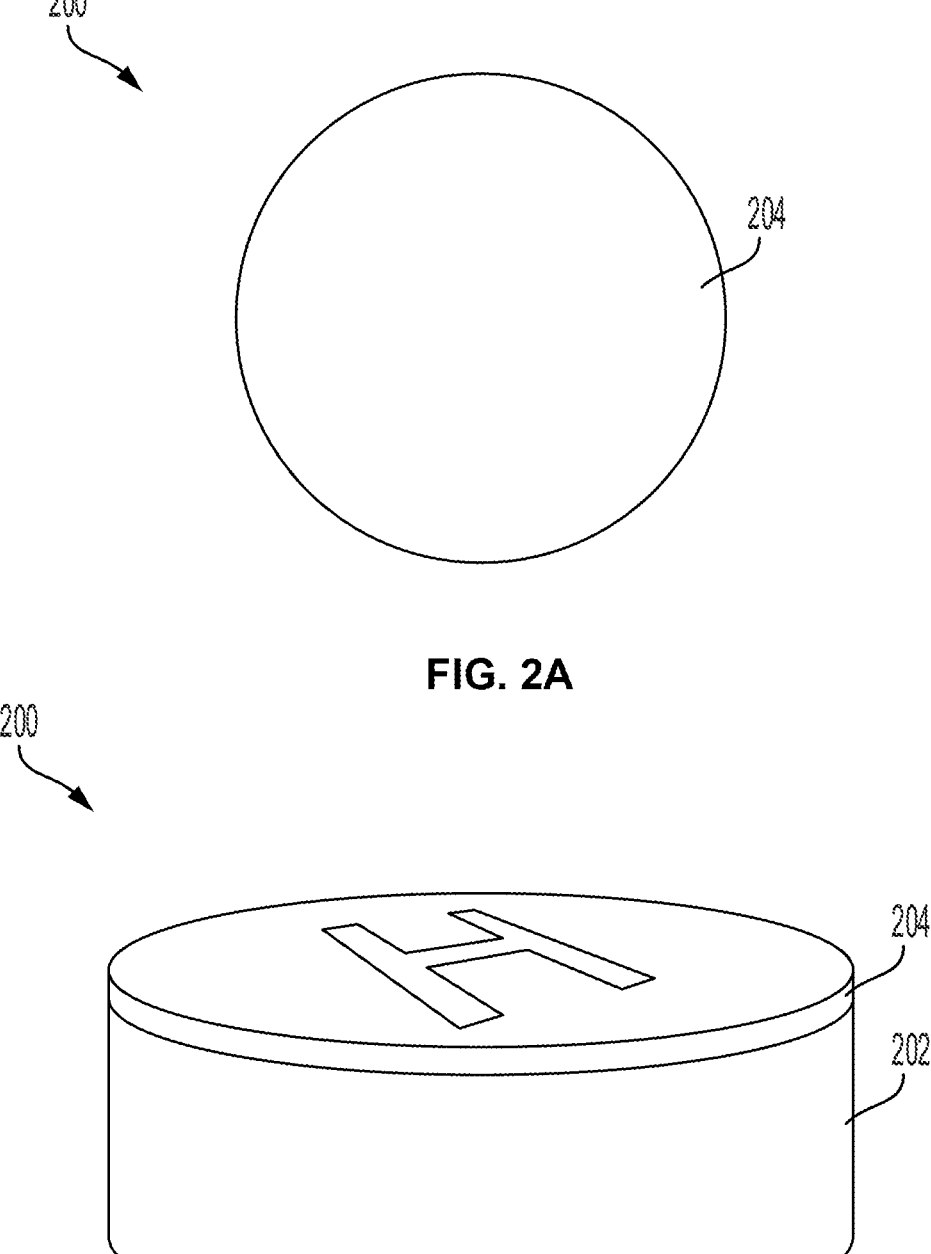
FIG. 2A is a top view of a launching platform for a vertiport for an aircraft, according to exemplary embodiments of the present invention.
FIGS. 2B-2E are perspective views of launching platforms of a vertiport, according to exemplary embodiments of the present invention.

FIG. 2A is a top view of a launching platform for a vertiport for an aircraft, according to example embodiments, and FIGS. 2B-2E are perspective views of launching platforms of a vertiport, according to exemplary embodiments of the present invention. As illustrated, the launching platform 200 may include a base surface 202 and a damping material 204 such that the damping material 204 covers at least a portion of the base surface 202. While not shown in the Figures, the vertiport may include markings, lighting, and visual aids to help guide and orient an aircraft utilizing the vertiport as well as to keep the area surrounding the vertiport safe. Such markings and visual aids may include, for example, painted or preformed materials, reflective paint and retroreflective markers, outlining markings and lines, perimeter markings, size/weight limitation markings, and identification markings or symbols denoting the TLOF of the vertiport. The lighting may include omnidirectional perimeter lighting (general lighting as well as lights to illustrate the corner or edges of the TLOF and/or other aspects of the vertiport), elevated lighting, lighting within the surface of the TLOF, flight path alignment lighting (such as approach lights), visual glideslope indicators (VGSI), floodlights, and/or identification beacon(s). The vertiport may also include safety netting and/or additional safety features, particularly for elevated or raised vertiports. The vertiport may also include additional infrastructure/technology/services known to those skilled in the art, such as infrastructure/technology/services for sensing the weather, providing safety and security, providing electric charging or fueling capabilities, providing firefighting or medical capabilities, and providing access to those with disabilities.

Figure 2C:
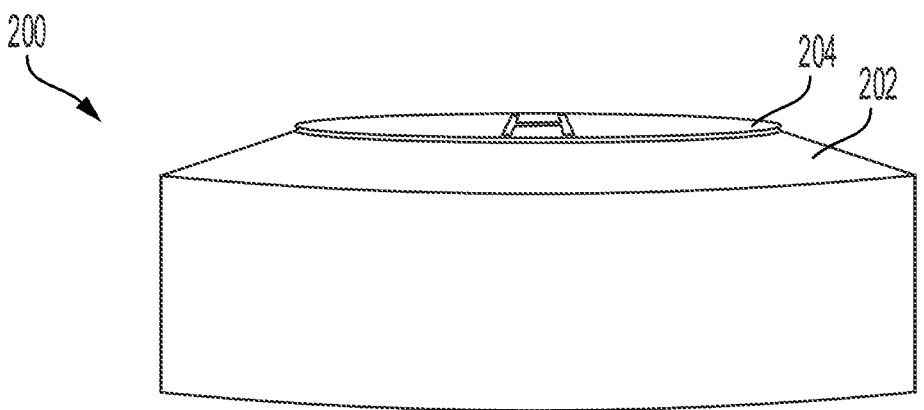

As a person of ordinary skill in the art will realize, the damping material could be any suitable thickness based on its construction and needs. For example, as shown in FIGS. 2A-2C, the damping material 204 may be a layer of material having a uniform thickness across its area. For instance, in some embodiments, the damping material 204 may have a thickness between 1 inch and 5 inches, such as between 2 inches and 4 inches or a thickness of 3 inches uniformly across an area of the damping material 204. The thickness of the damping material 204 may be based on the target frequencies or noise signature from the aircraft to be reduced. For instance, the damping material 204 may have less thickness (e.g., ½ inch) to dampen high frequency noise and a greater thickness (e.g., 6 inches) to dampen a lower frequency noise.

Figure 2D:
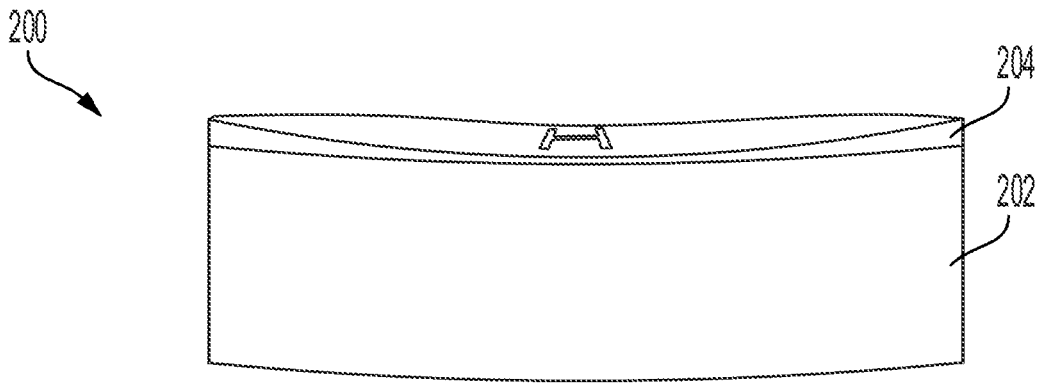
Figure 2E:
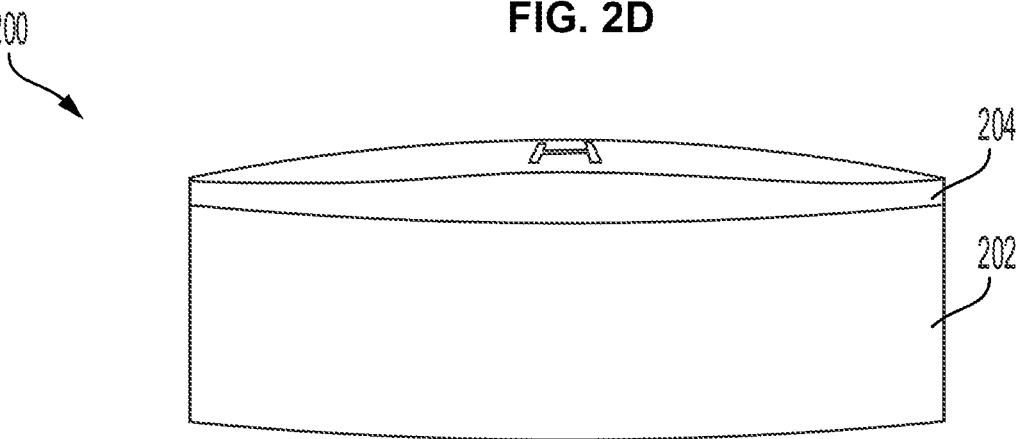

In other embodiments, the damping material 204 is a layer of material that does not include a uniform thickness across its area. For instance, as shown in FIG. 2D, in some embodiments, the damping material 204 has a thickness that is greater towards a radially outward distance from a center of the base surface 202 such that the damping material is thickest proximate an outer perimeter of the base structure 202. In other embodiments, as shown in FIG. 2E, the damping material 204 has a thickness that is smaller towards a radially outward distance from a center of the base surface 202 such that the damping material is thickest in the center of the base surface 202. In other embodiments, the damping material 204 has a thickness that varies across its area, either according to a pattern, randomly, or in accordance with predetermined pocketing designed to improve damping of noise for a particular aircraft. As such, the damping material 204, having a variable thickness across its area, may result in a varied acoustic attenuation of the damping material 204. Therefore, each thickness of the variable thicknesses may be able to attenuate different levels of noise, at different frequencies, and may be used to optimize the most effective use of the damping material 204 of the vertiport 200 to attenuate the noise.

Figure 3A:
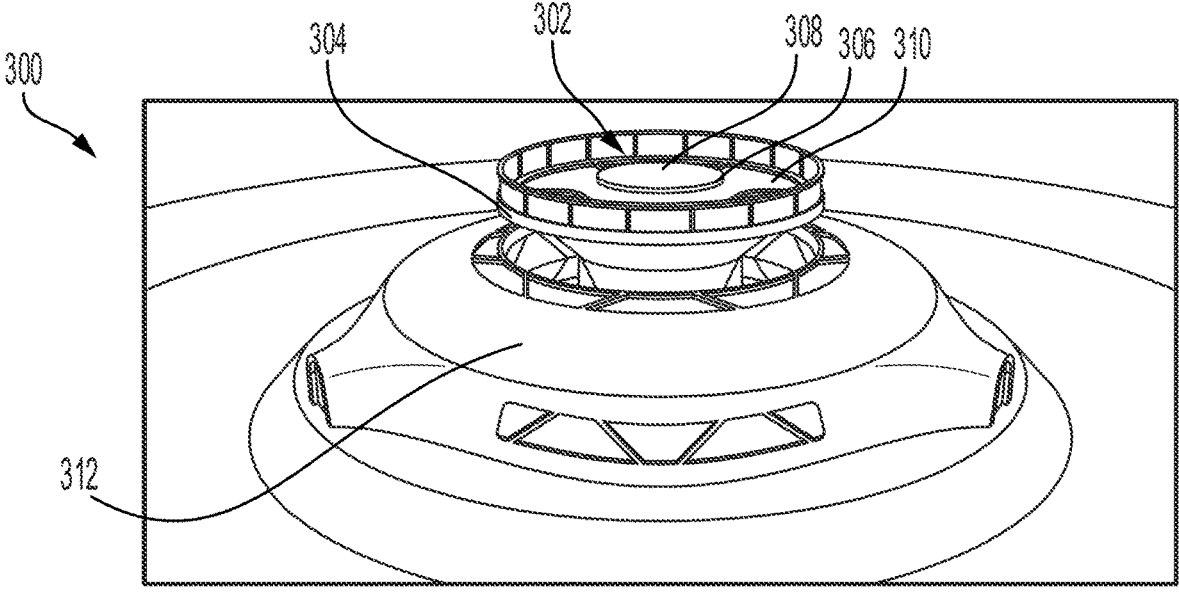
FIGS. 3A-3B are perspective views of a vertiport, according to exemplary embodiments of the present invention.
Figure 3B:
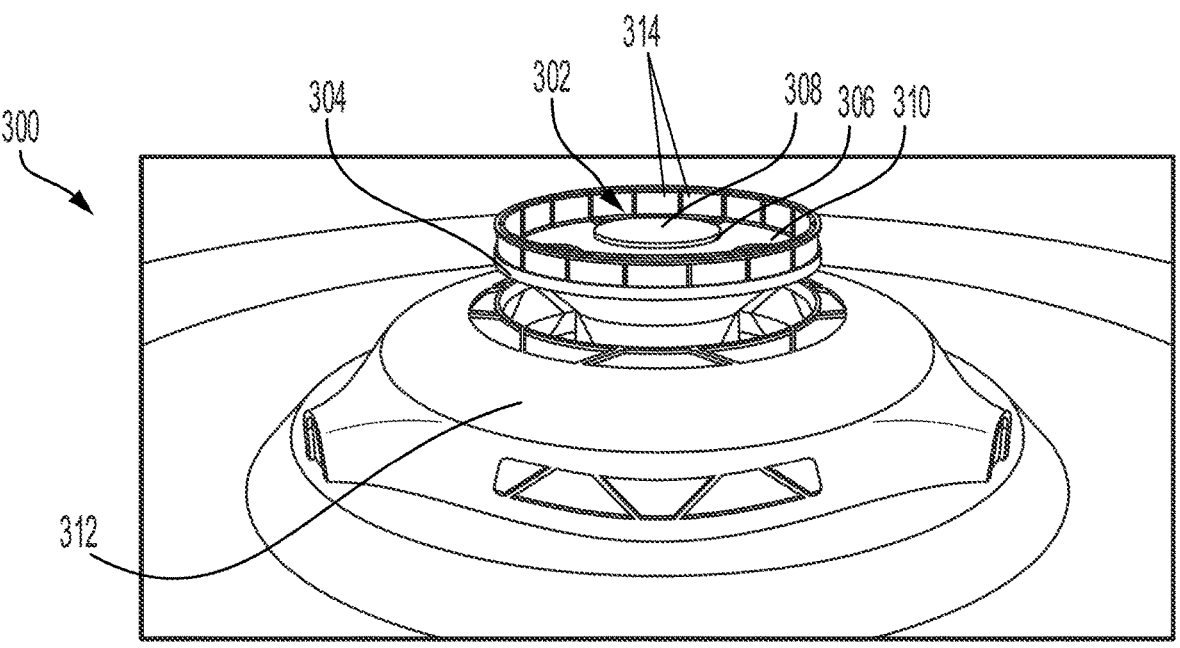

FIGS. 3A-3B are perspective views of a vertiport, according to exemplary embodiments of the present invention. As illustrated, the vertiport 300 may include at least a launching platform 302, a supporting structure 304, and a safety area 310 for aircraft operation. The safety area 310 surrounds the launching platform 302.

The launching platform 302 includes a base surface 306 and a damping material 308 such that the damping material 308 covers at least a portion of the base surface 306. As depicted in FIGS. 3A and 3B, the damping material 308 covers the entirety of a top surface of the base surface 306. The base surface 306 and the damping material 308 could comprise any combination of components described with respect to FIGS. 1-2E. The damping material 308 may attenuate noise, enhance stability, and/or reduce vibrations during an aircraft landing and/or takeoff in the surrounding area of the vertiport 300.

In some embodiments of the vertiport 300, one or more damping pads 314 are incorporated into the vertiport 300 or on other objects in the environment around the vertiport 300, as illustrated on an interior wall of a surrounding ledge of the supporting structure 304 of the vertiport 300 in FIG. 3B. The damping pads 314 may aid in noise and vibration absorption in the surrounding area of the vertiport 300.

Figure 4A:
FIGS. 4A-4C are perspective views of a vertiport in environments, according to exemplary embodiments of the present invention.
Figure 4A:
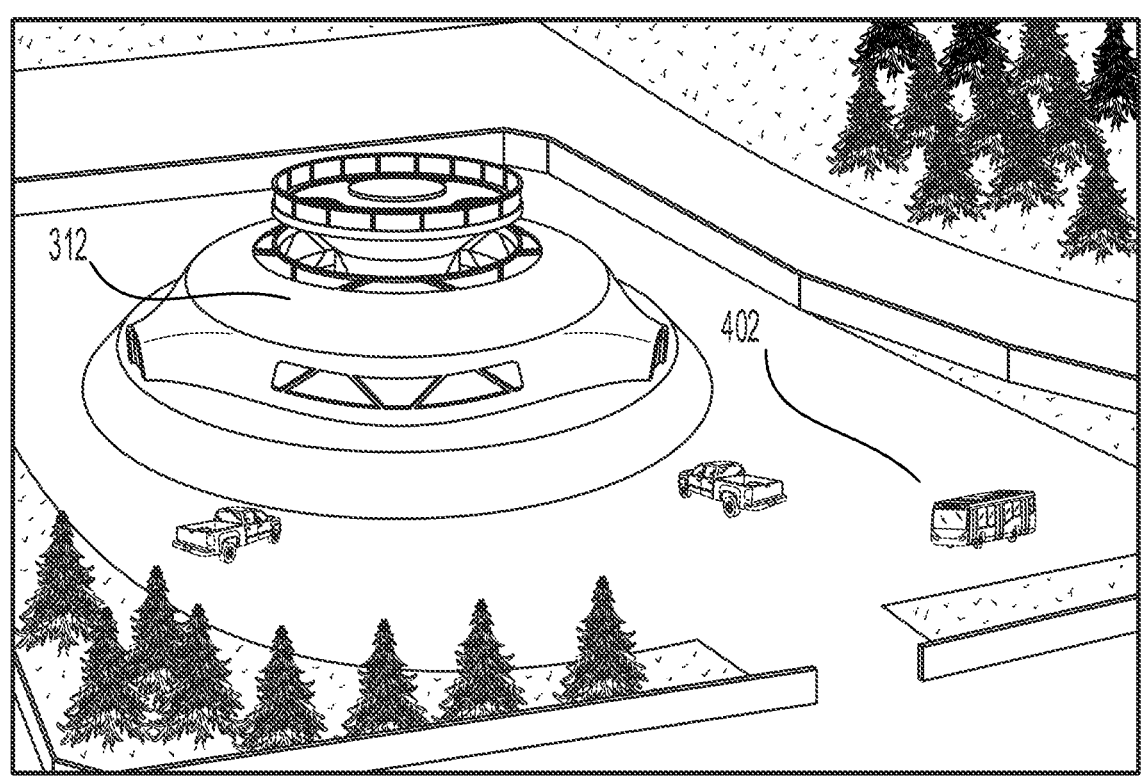
Figure 4B:
Figure 4B:
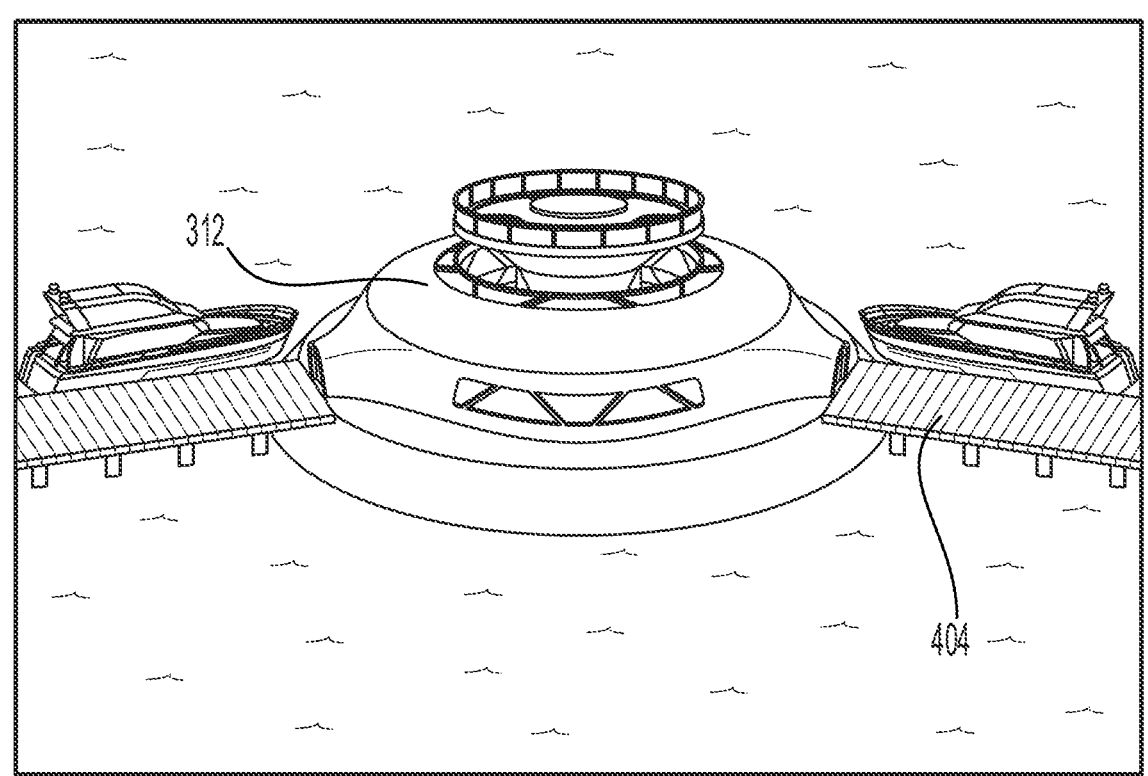
Figure 4C:
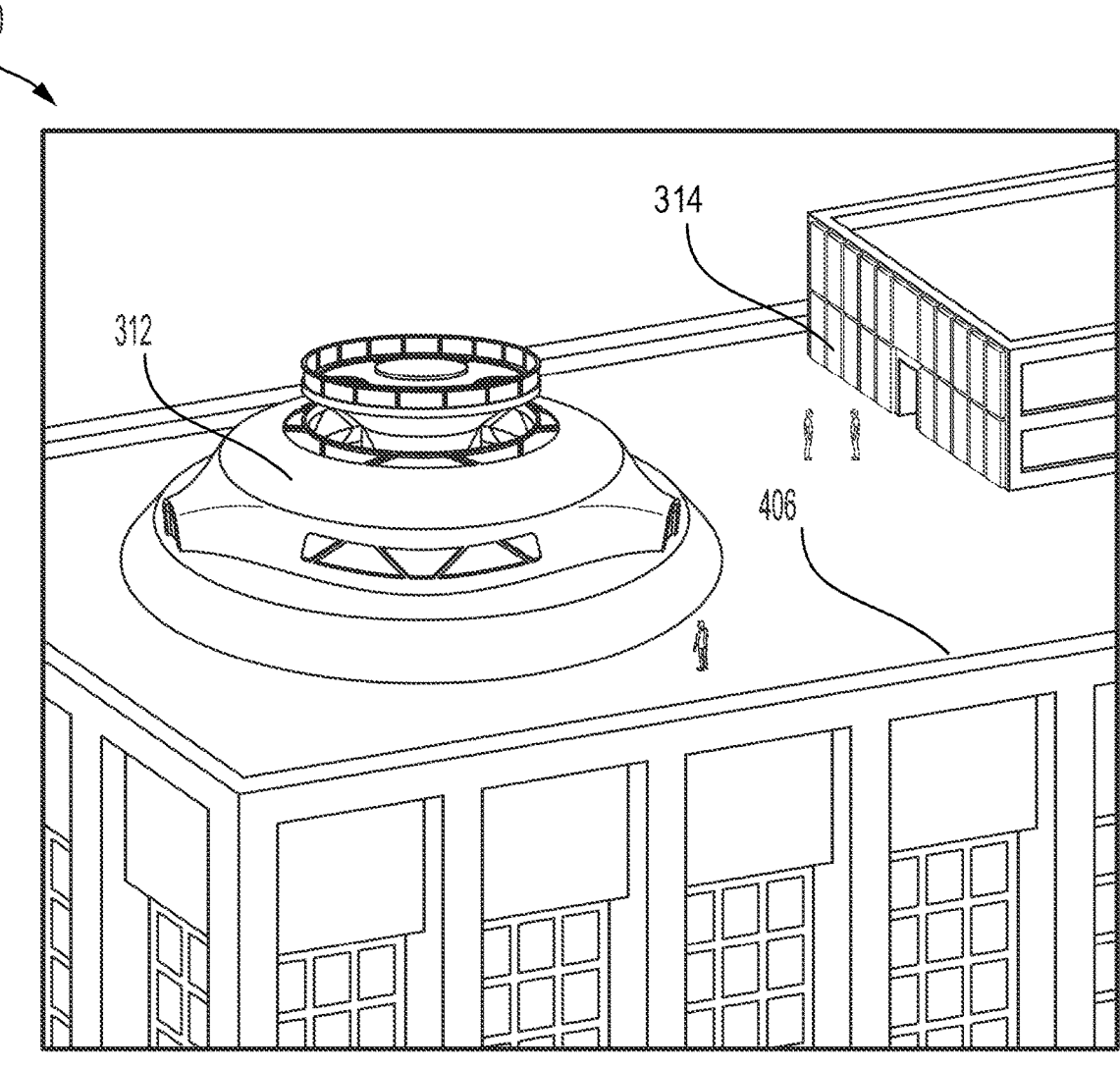

FIGS. 4A-4C are perspective views of a vertiport in environments, according to exemplary embodiments of the present invention. As illustrated, vertiport 300 may include an infrastructure 312 on which the support surface 304 may be located. The infrastructure 312 may be any sort of physical structure. For instance, FIG. 4A depicts the vertiport 300 having an infrastructure 312 on a parking lot 402 in a forested area, FIG. 4B depicts the vertiport 300 having the infrastructure 312 on a platform 404 in a water-based environment that is accessible by a nautical vehicle, such as a boat, and FIG. 4C depicts the vertiport 300 having the infrastructure 312 on a roof of a building 406 in an urban environment. In FIG. 4C, damping pads 314 are installed on a facing wall of the building 406.

The infrastructure 312 could be any known location at which it is desirable to allow an aircraft to take-off and/or land, including but not limited to a base camp, a café, a sports complex, a concert hall, an apartment complex, an office building, an airport, a hospital, or any other structure in which people can access, gather, visit, and/or live. Because it is envisioned that in many cases the infrastructure 312 is suitable for individuals, the damping material 308 may reduce noise of the airplane takeoff and landing from the vertiport 300 such that the people within and around the infrastructure 312 are not bothered by the noise.

Although FIGS. 2A-4C depict specific structures and embodiments of a vertiport, in some embodiments a vertiport may take any form and may be constructed in any suitable manner known to those skilled in the art, and exemplary embodiments of the present invention may be incorporated into any vertiport structure without losing its functionality. Moreover, in some embodiments, a vertiport may be incorporated into an existing structure as opposed to being a separate structure, and exemplary embodiments of the present invention may be incorporated into such a structure without losing its functionality.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

What is claimed is:

1. A vertiport for an aircraft, the vertiport comprising:
   a launching platform comprising a base surface and a damping material, wherein the damping material covers at least a portion of the base surface, and wherein the damping material comprises:
   a base material, wherein the base material is a rubber material selected to reduce deformation with use; and
   a filling material inserted into the base material such that the base material substantially surrounds or encloses the filling material, wherein the filling material is an acoustically absorbing material.

2. The vertiport of claim 1, wherein the base surface has a shape comprising at least one of: a cylindrical shape, a rectangular shape, a cubical shape, a conical-frustum shape, and a trapezoidal shape.

3. The vertiport of claim 1, wherein the base surface has a material composition comprising at least one of: clay, concrete, cement, stone, pavement, and metal.

4. The vertiport of claim 1, wherein the damping material has an acoustically varying impedance across the length of the base material.

5. The vertiport of claim 1, wherein the damping material further comprises a stiffness to damping ratio such that the base material is configured to support passenger ingress to and egress from an aircraft on the vertiport.

6. The vertiport of claim 1, wherein the rubber material comprises a natural rubber.

7. The vertiport of claim 1, wherein the damping material has a constant thickness across the portion of the base surface covered by the damping material.

8. The vertiport of claim 1, wherein the damping material has a variable thickness across the portion of the base surface covered by the damping material.

9. The vertiport of claim 8, wherein the variable thickness of the damping material comprises a thickness that is greater towards a radially outward distance from a center of the base surface.

10. The vertiport of claim 1, further comprising a supporting structure, wherein the supporting structure supports at least a portion of the launching platform.

11. The vertiport of claim 10, wherein one or more damping pads is applied to the supporting structure.

12. The vertiport of claim 10, wherein the supporting structure is external to the launching platform.

13. A method of moving an aircraft with respect to a launching platform of a vertiport, wherein the launching platform comprises a base surface and a damping material, and wherein the damping material covers at least a portion of the base surface, the method comprising:

moving the aircraft with respect to the launching platform, such that the damping material reduces noise from the aircraft, and wherein the damping material comprises:

a base material, wherein the base material is a rubber material selected to reduce deformation with use; and a filling material inserted into the base material such that the base material substantially surrounds or encloses the filling material, wherein the filling material is an acoustically absorbing material.

14. The method of claim 13, wherein the damping material absorbs noise from the aircraft.

15. The method of claim 13, wherein the moving the aircraft comprises landing the aircraft on the launching platform, such that the damping material reduces noise from the aircraft during landing.

16. The method of claim 13, wherein the moving the aircraft comprises the aircraft taking off from the launching platform, such that the damping material reduces noise from the aircraft during takeoff.

17. A vertiport for an aircraft, the vertiport comprising:

an infrastructure;

a support surface extending above the infrastructure; and a launching platform installed on a top of the support surface comprising a base surface and a damping material, wherein the damping material covers at least a portion of the base surface, and wherein the damping material comprises:

a base material, wherein the base material is a rubber material selected to reduce deformation with use; and a filling material inserted into the base material such that the base material substantially surrounds or encloses the filling material, wherein the filling material is an acoustically absorbing material.

18. The vertiport of claim 17, wherein the infrastructure comprises a substantially rounded structure, and wherein the support surface extends upwards from a central portion of the substantially rounded structure of the infrastructure.

19. The vertiport of claim 17, wherein the infrastructure comprises a floating structure in a water-based environment.

20. The vertiport of claim 17, wherein the infrastructure comprises an elevated structure on a roof of a building in an environment.

21. The vertiport of claim 1, wherein the damping material has a thickness between 1 to 5 inches.

* * * * *